Patented June 25, 1946

2,402,644

UNITED STATES PATENT OFFICE 2,402,644

CHEMICAL PROCESSES

Wilbur A. Lazier, Frank K. Signaigo, and James H. Werntz, Wilmington, Del., assignors to E. I. du Pont de Nemours & Company, Wilmington, Del., a corporation of Delaware No Drawing. Application September 18, 1941, Serial No. 411,337

7 Claims. (Cl. 260—609)

This invention relates to a catalytic process and, more particularly, it relates to a process for the catalytic hydrogenation of organic sulfur compounds. Specifically, this invention relates to a process for converting sulfurized ethylenic compounds containing certain other functional groups by catalytic hydrogenation into polyfunctional organic compounds containing a mercapto group.

In recent years organic compounds containing more than one functional group have become of considerable industrial importance since materials of this type readily lend themselves to the production of useful polymeric products and are also of general interest as chemical intermediates. Compounds of this type which contain a mercapto group are especially attractive in this connection because of their highly reactive and unique properties. Such materials have been, however, difficult or uneconomical to obtain by classical methods and accordingly have been of little commercial interest. It is evident that the discovery of a novel and practical catalytic synthesis of organic polyfunctional compounds containing a mercapto group from readily available raw materials constitutes an important advance in the field of sulfur chemistry.

This invention has as its object an economical process for obtaining polyfunctional organic compounds containing a mercapto group. Another object is the preparation of substituted thiols by catalytic hydrogenation of sulfurized olefinic compounds. Still another object is the preparation of thiols by the hydrogenation of sulfurized ethylenic compounds containing certain other functional groups. Other objects will be apparent from the following description of the invention.

These objects are accomplished by heating a sulfurized ethylenic compound containing a group in which carbon is joined to a dissimilar atom by a multiple bond in contact with hydrogen at superatmospheric pressure and a sulfactive hydrogenation catalyst.

In practicing this invention the sulfurized ethylenic compound containing another functional group such as a carboxyl group or derivative thereof, or a carbonyl group, is placed in a hydrogenation autoclave together with a sulfactive hydrogenation catalyst such as a metal sulfide catalyst. Optionally a suitable solvent may be employed. The autoclave is then charged with hydrogen at superatmospheric pressure and agitated and heated to a temperature at which reaction proceeds at a suitable rate, usually in the neighborhood of 125° to 150° C. After the reaction is complete as evidenced by no further hydrogen absorption the autoclave is cooled and the product is filtered from the catalyst and blown with inert gas to expel any hydrogen sulfide formed. The thiol so produced may then be isolated or purified by the usual methods of distillation, crystallization or solvent extraction.

The following examples show in greater detail the practice of this invention in several of its modifications. The amounts of materials referred to are parts by weight.

Example I

Fifty-six parts of sulfurized oleic acid obtained by heating a mixture of oleic acid and 3 atomic equivalents of sulfur at 150° to 160° C. is dissolved in 100 parts of benzene and charged into a hydrogenation autoclave together with 6 parts of cobalt trisulfide catalyst prepared as described in the copending application of F. K. Signaigo, Serial No. 319,241, filed February 16, 1940. Hydrogen is then charged into the autoclave to a pressure of 1500 lbs./sq. in. and the autoclave is agitated and heated at 150° C. for 4 hours. The autoclave is then cooled and the contents are filtered to separate the catalyst and blown with nitrogen to remove the hydrogen sulfide formed. The solvent is then removed by heating the mixture under reduced pressure, leaving as the less volatile product an amber oil containing 10.8% of mercapto sulfur. The calculated value for mercaptostearic acid is 10.1% mercapto sulfur.

Example II

Ninety-five parts of methyl oleate is heated and stirred with 32 parts of sulfur at 160° C. for 6 hours. The viscous oily product is charged into a hydrogenation autoclave together with 10 parts of finely divided iron powder prepared by extracting the aluminum with boiling sodium hydroxide solution from a finely ground alloy of equal weights of iron and aluminum. The iron combines with a portion of the sulfur in the sulfurized compound to form a sulfactive iron sulfide catalyst. The autoclave is charged with hydrogen and agitated at 175° C. at a pressure of 1500 to 2300 lbs./sq. in. for 2 hours. At this point the absorption of hydrogen ceases and the reaction is complete. The autoclave is cooled, the product rinsed out with benzene, and filtered to separate the catalyst. Removal of the hydrogen sulfide and solvent by heating leaves 106 parts of a liquid residue of crude methyl mercaptostearate. This product contains 9.0% of mercapto sulfur as compared with 9.7% theory for methyl mercaptostearate.

*Example III*

N-isobutylundecylenamide is sulfurized by heating and stirring 59 parts of the amide with 16 parts of sulfur at 150° to 160° C. for 4 hours. The crude product is dissolved in 100 parts of dioxane and charged into a hydrogenation autoclave together with 15 parts of nickel-on-kieselguhr catalyst prepared by reducing precipitated nickel carbonate with hydrogen. During the period of heating to reaction temperature, the nickel reacts with some of the sulfur in the sulfurized material forming an active nickel sulfide catalyst. The autoclave is charged with hydrogen to a pressure of 1500 lbs./sq. in. and is then agitated and heated at 160° C. for 3 hours. During this period a pressure decrease of 400 lbs./sq. in. is noted. After separating the product from the catalyst and solvent, 63 parts of a mercapto-containing viscous oil is obtained.

The above examples serve to illustrate representative embodiments of the invention. The various conditions of temperature, pressure, catalyst, reaction time, reactants, etc. are, however, subject to considerable variation within the scope of the invention.

In a broad sense the invention contemplates the hydrogenation of sulfurized ethylenic compounds containing certain other functional groups at elevated temperatures and pressures, either batchwise or by continuous methods. The specific conditions employed in the hydrogenation of sulfurized ethylenic compound will be governed to a considerable extent by the method selected and by the properties of the material itself. In general the hydrogenation process of the invention may be carried out in the liquid phase at pressures of at least 10 atmospheres and temperatures above 75° C. but below 300° C. For batchwise operation it has been found particularly convenient to employ pressures between about 30 and 300 atmospheres and temperatures from 100° to 200° C. Within the temperature range cited the lower temperatures are particularly well suited for hydrogenating sulfurized compounds containing two sulfur atoms bonded together, compounds in which a sulfur atom is carried by a carbon atom attached to an aromatic nucleus and compounds in which two or more sulfur atoms are bound to adjacent carbon atoms. The higher temperatures are best suited to the hydrogenation of compounds containing a sulfur atom linked to two carbon atoms not bound to each other. The selection of pressure is chiefly a matter of convenience, in general higher pressure leading to more rapid reaction.

In the practice of this invention sulfurized ethylenic compounds can be hydrogenated either alone or dissolved in suitable solvents. If solvents are employed, materials of the type represented by benzene, toluene, xylene, petroleum ether and ligroin are satisfactory. Alcohol, ether, dioxane and the like, are also suitable. Non-solvents such as water may also be employed as the reaction medium, and the presence of acids or alkalis may be beneficial in certain cases. It is preferable, however, to avoid the use of solvents wherever possible in view of the recovery problem and attendant reduction in equipment efficiency.

Sulfactive catalysts suitable for use in the process of this invention may be selected from the group comprising the sulfides and polysulfides of metals of groups VI and VIII of the periodic table. Examples of catalyst compositions which are particularly efficient are the sulfides of cobalt, nickel, iron, molybdenum, tungsten, and chromium and of these the first four mentioned are preferred because of their high activity. These catalysts are conveniently prepared according to the methods described in the copending applications of F. K. Signaigo, Serial No. 319,241, filed February 16, 1940 and Serial No. 319,242, filed February 16, 1940 and that of B. W. Howk, Serial No. 353,936, filed August 23, 1940. For example, efficient catalysts can be produced by precipitation methods in which a soluble salt of a metal such as cobalt is treated in solution with sodium or ammonium polysulfide. Particularly active catalysts are obtained by treating a pyrophoric hydrogenating metal with a sulfiding agent such as hydrogen sulfide, free sulfur or organic compounds of bivalent sulfur at moderate temperatures. The latter process may be carried out conveniently in situ prior to the hydrogenation operation by charging the free metal together with the sulfurized olefin to be hydrogenated. The former will react with some of the sulfurized olefin as the reaction mixture is brought up to temperature with the formation of a sulfactive metal sulfide catalyst. The selection of a particular catalyst for the hydrogenation of sulfurized ethylenic compounds will depend principally upon the considerations of temperature and pressure to be employed in the hydrogenation process since some catalysts are active at lower temperatures than others. Generally speaking, the catalysts of this invention can be employed in the massive state or deposited on a suitable supporting material such as kieselguhr, pumice, or activated charcoal. The catalysts may be used singly or in various combinations. For liquid phase, batch operations it is preferred to use between about 1 and 15 parts of catalyst in the form of finely divided powder. For continuous liquid phase hydrogenation, solid lumps or briquettes of suitable size and capable of withstanding erosion will be found desirable.

Broadly, this invention comprises a process for producing thiols by hydrogenating sulfurized olefinic compounds containing a carbon atom bound by a plural bond to a dissimilar atom. Specific examples of substituted olefins, the sulfurized derivatives of which serve as one class of starting materials for this process, are unsaturated acids such as acrylic, methacrylic, crotonic, undecylenic, oleic, abietic, linoleic, cinnamic, linolenic, furylacrylic, maleic, tetrahydrophthalic, unsaturated naphthenic acids and the like; unsaturated esters such as the alkyl and aryl esters and glycerides of the aforementioned acids, unsaturated animal and vegetable oils; simple and N-substituted amides of unsaturated acids as, for example, oleic amide, N-isobutyl-undecylenic amide; unsaturated nitriles as, for example, acrylonitrile, methacrylonitrile, oleonitrile; unsaturated aldehydes typified by acrolein, crotonaldehyde, 2-ethylhexenal, geranial, citronellal, cinnamic aldehyde; unsaturated ketones such as methyl vinyl ketone, mesityl oxide, phorone, 2-methylheptene-2-one-6, carvone and cyclohexenone; unsaturated nitrogen and sulfur compounds such as unsaturated thioaldehydes and thioketones, unsaturated aldimines, ketimes, anils, hydrazones, oximes and semicarbazones.

The sulfurized ethylenic compounds that may be hydrogenated to thiols according to this invention are characterized as the class of organic sulfur compounds formed by the reaction of a compound containing an ethylenic group with a sulfurizing agent. Among the sulfurizing agents that may be used in this connection, sulfur is especially important because of its effectiveness and low cost. Other sulfurizing agents may be employed, however, and these generally contain at least two sulfur atoms bound to each other. Examples of such materials are inorganic and organic polysulfides such as sodium polysulfide, diethyltetrasulfide, hydrogen disulfide and sulfur monochloride. Catalysts such as the chlorides of aluminum, iron and zinc may be employed for the sulfurization process but these are not essential in most cases. The structure of the sulfurized ethylenic compounds has not been determined in most instances and consequently definite formulas cannot be assigned to such products.

Thiols prepared by the above described process are valuable intermediates for the synthesis of useful products such as surface-active agents, resins and synthetic polymers, for addition to lubricating oils and as modification agents for natural and synthetic rubbers.

As many apparently widely different embodiments of this invention may be made without departing from the spirit and scope thereof, it is to be understood that this invention is not to be limited to the specific embodiments shown and described.

We claim:

1. A process for the production of mercapto carboxylic compounds which comprises catalytically hydrogenating a sulfurized ethylenic carboxylic compound at a temperature within the range of 100 to 200° C. and at a pressure of at least 10 atmospheres in the presence of a sulfactive hydrogenation catalyst.

2. The process of claim 1 characterized in that the catalyst is a sulfide selected from the group consisting of the sulfides of iron, nickel, cobalt, molybdenum, and chromium.

3. The process of claim 1 characterized in that the compound hydrogenated is the sulfurized unsaturated carboxylic acid substance selected from the class of the acid, its anhydrides, its esters and its amides.

4. The process of claim 1 in which the compound hydrogenated is a sulfurized unsaturated ester.

5. A process for the production of mercapto carboxylic compounds which comprises bringing a mixture of hydrogen and a sulfurized ethylenic carboxylic compound into contact with a catalytic metallic component whose sulfide forms a sulfactive hydrogenation catalyst and heating said mixture in contact with hydrogen at a temperature within the range of 100 to 200° C. and under a pressure in excess of 10 atmospheres, thereby simultaneously converting the catalytic metallic component to a sulfactive hydrogenation catalyst and catalytically hydrogenating said sulfurized ethylenic carboxylic compound.

6. A process for the production of mercapto glyceride which comprises catalytically hydrogenating a sulfurized unsaturated glyceride in the presence of a sulfactive hydrogenation catalyst at a temperature within the range of 100 to 200° C. and at a pressure of at least 10 atmospheres.

7. A process for the production of a mercapto acid which comprises catalytically hydrogenating a sulfurized unsaturated acid in the presence of a sulfactive hydrogenation catalyst at a temperature within the range of 100 to 200° C. and at a pressure of at least 10 atmospheres.

WILBUR A. LAZIER.
FRANK K. SIGNAIGO.
JAMES H. WERNTZ.